Patented Feb. 11, 1947

2,415,645

UNITED STATES PATENT OFFICE 2,415,645

METHOD OF PREPARING HYDRA-CRYLAMIDE

Myrl Lichtenwalter and Oscar F. Wiedeman, Old Greenwich, Conn., assignors to American Cyanamid Company, New York, N. Y., a corporation of Maine No Drawing. Application August 31, 1944, Serial No. 552,220

5 Claims. (Cl. 260—561)

The present invention relates to a method of preparing hydracrylamide.

It has been discovered that hydracrylamide may be prepared by treating ethylene cyanohydrin with an aqueous alkaline solution where the mixture has an initial pH within the range of 9 to 12.5.

Any alkaline material is effective as a catalyst for the reaction provided it is used in the above pH range. Those preferred for the hydrolysis of ethylene cyanohydrin to hydracrylamide according to the equation

$$HO.CH_2.CH_2.CN + H_2O \rightarrow HO.CH_2.CH_2.CONH_2$$

include ammonia, alkali metal carbonates, alkali-forming metal hydroxides, and alkyl amines which provide a pH within the above specified range.

The pH range of 9 to 12.5 is critical because below 9, no or substantially no hydracrylamide is formed, and above 12.5 any hydracrylamide produced is almost completely converted to a salt of hydracrylic acid.

It has been found desirable to carry out the hydrolysis at a temperature within the range of 20–100° C., and preferably between 25 and 65° C. In general, increasing the temperature increases the rate of reaction, but also increases the amount of by-products formed.

The crude product may be purified by recrystallization from a low molecular weight aliphatic ketone, such as, for example, acetone or methyl ethyl ketone, or by distillation at reduced pressure.

Example 1

A mixture consisting of 710 grams of ethylene cyanohydrin, 465 grams of 28% aqua-ammonia and 517 grams of water, having an initial pH of 11.6, was stored at 50° C. for 35 days. It was then distilled under reduced pressure to remove the ammonia, water, and any unreacted ethylene cyanohydrin. The remaining material crystallized on cooling to room temperature. A portion of the crude product was refined by centrifuging to yield hydracrylamide of 98% purity. Another portion of the crude material, after recrystallization from methyl ethyl ketone, gave a purified hydracrylamide, a white crystalline product having a melting point of 66° C.

Example 2

A mixture consisting of 743 grams of ethylene cyanohydrin and 955 grams of 28% ammonium hydroxide, having an initial pH of 12.2, was stored at 50° C. for 16 days. After removing the ammonia, water, and unreacted ethylene cyanohydrin by distillation under reduced pressure, the remaining residue was distilled. Hydracrylamide was obtained, boiling at 160° C./2 mm. pressure.

Example 3

574 grams of ethylene cyanohydrin were added to a solution consisting of 99 grams of diethylamine dissolved in 699 grams of water. The mixture, having a pH of 12.1, was stored for 38 days at 40° C. It was then heated under reduced pressure to remove the diethylamine, water, and unreacted ethylene cyanohydrin. The remaining residue of crude hydracrylamide was refined by centrifuging to yield a product of high purity.

Example 4

A mixture consisting of 374 grams of ethylene cyanohydrin, 748 grams of water and 53 grams of sodium carbonate, was heated at 60° C. for 40 hours. It was then cooled, the catalyst neutralized with sulfuric acid, followed by treatment with calcium carbonate to remove any possible traces of acid, and filtered. The filtrate was distilled under reduced pressure, first removing water and unreacted ethylene cyanohydrin, and then obtaining a distillate boiling at 140° C./2 mm. pressure. On cooling to room temperature, a large portion of the distillate crystallized. The crystalline material from the distillate, after three recrystallizations from acetone, gave a very pure hydracrylamide as a white, needle-shaped, crystalline product, melting at 66° C.

Example 5

154 grams of ethylene cyanohydrin were added to a solution consisting of 5 grams of sodium hydroxide dissolved in 150 grams of water. The mixture, having an initial pH of 10.9, was stored at 25° C. for 8 days. It was then neutralized with sulfuric acid, followed by vacuum distillation at 40 mm. pressure to remove the water. The remaining solution was filtered to remove the precipitated sodium sulfate. The filtrate was distilled under reduced pressure, first removing unreacted ethylene cyanohydrin, and then obtaining a distillate at 130–160° C./3–4 mm. pressure. After cooling to room temperature and adding a crystal of hydracrylamide, a large portion of the distillate crystallized. The crystalline material was recrystallized from acetone, yielding white, needle-shaped crystals of hydracrylamide which melted at 66° C.

Example 6

A mixture consisting of 142 grams of ethylene cyanohydrin, 250 grams of water and 2 grams of calcium hydroxide, having an initial pH of 11.9, was stored at 35-45° C. for 5 weeks. It was then neutralized with carbon dioxide and filtered. The filtrate was distilled under vacuum, first removing water and unreacted ethylene cyanohydrin, and then obtaining a distillate at 145-165° C./2-3 mm. pressure. The distillate partially solidified on seeding with a crystal of hydracrylamide. The solid material, after recrystallization from methyl ethyl ketone, gave a white crystalline product melting at 66° C.

Hydracrylamide is readily soluble in water, dioxane, and the low molecular weight aliphatic alcohols.

While the invention has been described with particular reference to specific embodiments, it is to be understood that it is not to be limited thereto, but is to be construed broadly and restricted solely by the scope of the appended claims.

We claim:

1. A method of producing hydracrylamide which includes the steps of bringing together ethylene cyanohydrin and an aqueous alkaline solution to produce a mixture having an initial pH within the range of 9 to 12.5, and recovering the hydracrylamide from the reaction product.

2. The method of claim 1 in which the aqueous alkaline solution contains a material chosen from the group consisting of ammonia, diethylamine, sodium carbonate, sodium hydroxide and calcium hydroxide.

3. The method of claim 1 in which the mixture is maintained at a temperature of from 20 to 100° C.

4. A method of producing hydracrylamide which includes the steps of bringing together ethylene cyanohydrin and ammonia in an aqueous solution to produce a mixture having an initial pH within the range of 9 to 12.5, maintaining the mixture at a temperature within the range of 25-65° C., and recovering the hydracrylamide from the reaction product.

5. A method of producing hydracrylamide which includes the steps of bringing together ethylene cyanohydrin and ammonia in an aqueous solution to produce a mixture having an initial pH within the range of 9 to 12.5, maintaining the mixture at a temperature within the range of 25-65° C., recovering the hydracrylamide from the reaction product, and recrystallizing the hydracrylamide from a low molecular weight aliphatic ketone.

MYRL LICHTENWALTER.
OSCAR F. WIEDEMAN.

REFERENCES CITED

The following references are of record in the file of this patent:

UNITED STATES PATENTS

| Number | Name | Date |
|---|---|---|
| 2,375,005 | Kung | May 1, 1945 |
| 2,234,016 | Woodhouse | Mar. 4, 1941 |

OTHER REFERENCES

Sidgwicks, "Organic Chemistry of Nitrogen" (1937), p. 139, 310, 311 and 312.

Read, "Organic Syntheses;" vol. VII, 1927, pp. 54 and 55. (Copy in Div. 6.)

Heintz, "Jahresbericht uber die Forschutte der Chemie" (1861), page 446.

Krieble et al., Jour. Am. Chem. Soc., vol. 61, pp. 560 to 563 (1939).

Goss et al., "Jour. Chem. Soc." (London), vol. 127, p. 2780 (1925). (Copies in Scientific Library.)

Johanson, "Chem. Zent.," vol. 87 (1916) pp. 557-558.